Patented Aug. 22, 1939

2,170,381

UNITED STATES PATENT OFFICE 2,170,381

COMPOUNDS OF THE BENZANTHRONE SERIES

Edward T. Howell, Milwaukee, Wis., assignor to E. I. du Pont de Nemours & Company, Wilmington, Del., a corporation of Delaware No Drawing. Application April 24, 1937, Serial No. 138,744

3 Claims. (Cl. 260—355)

This invention relates to the preparation of new compounds of the benzanthrone series and more particularly to the preparation of new halogen dialkoxyisodibenzanthrone compounds which are valuable dyestuffs and which also serve as valuable dyestuff intermediates in the preparation of other dyestuffs.

I have found that new compounds of the isodibenzanthrone series may be prepared by introducing halogen, such as bromine or chlorine, into the Bz2,Bz2'-dialkoxyisodibenzanthrone molecule. These new halogen containing isodibenzanthrone compounds may be prepared either by direct halogenation of the Bz2,Bz2'-dialkoxyisodibenzanthrone described more particularly in U. S. Patent 1,531,260 or by halogenation of the intermediate products, with subsequent oxidation and/or alkylation.

The object of the invention is to prepare new dyestuffs of the isodibenzanthrone series which dye in desirable shades of blue and which exhibit the fastness properties typical of the dyestuffs of the isodibenzanthrone series.

It is a further object of the invention to provide new dialkoxyisodibenzanthrone derivatives which serve as intermediates in the preparation of other dyestuffs by introducing into the molecule reactive halogen atoms.

The following examples are given to illustrate the invention more fully. The parts used are by weight.

Example 1

14.5 parts of 6-chloroisodibenzanthrone (obtained by the alcoholic potash fusion of 6,6'-dichloro-Bz1,Bz1'-dibenzanthronylselenide) are suspended in 290 parts of 92% sulfuric acid. After cooling to 3° C., 19 parts of 85% finely powdered manganese dioxide are added in portions during a period of 3 hours, maintaining the temperature at 3 to 5° C. The reaction mass is stirred an additional 16 hours at that temperature and then poured with stirring into 2000 parts of water. The precipitate is treated with 20 parts of sodium bisulfite dissolved in water, boiled, filtered, and washed acid-free. The resulting 6-chlorodihydroxyisodibenzanthrone in the form of an aqueous filter cake is suspended in 290 parts of nitrobenzene with 7.5 parts of sodium carbonate dissolved in a small amount of water. This mixture is heated with agitation until the water has distilled out and the temperature has risen to 150° C. The dehydrated mass is partially cooled, 29 parts of sodium carbonate are added and the temperature is raised to 160° C. At this point there are added 15 parts of dimethyl sulfate in portions during a period of 2 hours. After cooling to room temperature, the reaction mixture is filtered, washed with nitrobenzene and alcohol, and the cake is digested in hot water, filtered, washed alkali-free and dried. The resulting 6-chloro-Bz2,Bz2'-dimethoxyisodibenzanthrone (containing 6.38% chlorine) consists of a dark blue powder soluble in concentrated sulfuric acid with a bordeaux color and in warm alkaline hydrosulfite solution with a blue vat from which cotton is dyed in light greenish blue shades somewhat greener than that of the corresponding halogen-free compound.

Example 2

25 parts of Bz2,Bz2'-dioxoisodibenzanthrone (obtained by treating pure isodibenzanthrone according to the method of U. S. patent application Serial No. 91,440, July 18, 1936, omitting the bisulfite treatment) are dissolved in 375 parts of 100% sulfuric acid with 0.25 part of iodine and 75 parts of bromine in a closed vessel. The temperature is raised to 30° C. and maintained at that point for a period of 20 hours with agitation, whereupon the reaction mixture is cooled to 15° C. and poured into a solution of 100 parts of sodium bisulfite in cold water. The precipitate is boiled, filtered, and washed acid-free. The brominated dihydroxyisodibenzanthrone thus obtained, containing 19.34% bromine, consists of a dark blue powder giving a blue vat with alkaline hydrosulfite and dyeing cotton blue-green which turns yellow-green to alkali and bright blue to acid.

Methylation of this product by the process in Example 1 gives a brominated Bz2,Bz2'-dimethoxyisodibenzanthrone which consists of a dark blue powder soluble in concentrated sulfuric acid with brown color and in warm alkaline hydrosulfite solution with a blue vat from which cotton is dyed greenish blue shades fast to acids and alkali.

Example 3

25 parts of purified Bz2,Bz2'-dihydroxyisodibenzanthrone (obtained according to U. S. patent application Serial No. 91,440, July 18, 1936) are dissolved in 125 parts of chlorosulfonic acid at room temperature. 15.5 parts of bromine are added and the reaction mixture is stirred 16 hours at 20 to 25° C., after which it is poured into excess sodium bisulfite solution mixed with ice, filtered, and washed acid-free. The dibromodihydroxyisodibenzanthrone thus obtained contains 28.47% bromine, and consists of a blue-black powder soluble in warm alkaline hydrosulfite solution with a blue color. During methylation the resulting bromomethoxy compound loses one atom of bromine and the resulting product consists of a dark blue powder with coppery luster, soluble in warm alkaline hydrosulfite solution with a blue vat from which cotton is dyed greenish blue.

*Example 4*

40 parts of Bz2,Bz2'-dioxoisodibenzanthrone are dissolved in 200 parts of chlorosulfonic acid and are treated at 20 to 25° C. with 25.5 parts of bromine, to which 0.4 part of iodine has been added. The reaction mixture is stirred 16 hours at 20 to 25° C. and then poured cautiously into ice water containing 25 parts of sodium bisulfite. The precipitate is boiled, filtered and washed acid-free. The resulting crude bromodihydroxyisodibenzanthrone is purified as follows: 47 parts of the crude product are dissolved in 705 parts of 100% sulfuric acid and treated with 187 parts of 76% sulfuric acid, added uniformly during a period of several hours with stirring, followed by the addition of 48 parts of water added in similar manner. The resulting precipitate is filtered off and washed with two 50 part portions of 91% sulfuric acid. The strong acid cake is digested in water, treated with excess sodium bisulfite solution, filtered and washed acid-free. The resulting tetrabromodihydroxyisodibenzanthrone is soluble in concentrated sulfuric acid with a bordeaux color and in warm alkaline hydrosulfite with a blue color, from which cotton is dyed green-blue turning yellow-green to alkali and bright blue to acid.

Methylation of the tetrabromodihydroxyisodibenzanthrone by the procedure described in Example 1 gives a dimethoxyisodibenzanthrone containing approximately two atoms of bromine. It consists of a blue-black powder soluble in concentrated sulfuric acid with brown color and in warm alkaline hydrosulfite solution with blue vat from which cotton is dyed in a redder shade of blue than the halogen-free dimethoxy compound.

*Example 5*

7.6 parts of bromine, 5.7 parts of sulfuryl chloride and 0.09 part of iodine are suspended in 250 parts of 100% sulfuric acid. The mixture is cooled to 15° C. and 9.5 parts of finely powdered Bz2,Bz2'-dimethoxyisodibenzanthrone (obtained for example by methylation of the purified Bz2,Bz2'-dihydroxyisodibenzanthrone obtained according to U. S. patent application 91,440, July 18, 1936) are added in portions followed by 4.5 parts of boric acid. The reaction mixture is warmed to 29° C. and is stirred 20 hours at 29 to 30° C., after which it is cooled to 15° C. and diluted into 2500 parts of cold water containing 15 parts of sodium bisulfite in solution. The precipitate is filtered off and washed acid-free. The monobromodimethoxyisodibenzanthrone thus obtained consists of a dark blue powder with coppery luster giving a blue vat with warm alkaline hydrosulfite, from which cotton is dyed in greenish blue shades somewhat greener than the halogen-free dimethoxyisodibenzanthrone.

*Example 6*

25 parts of Bz2,Bz2'-dimethoxyisodibenzanthrone are dissolved at 10° C. in 125 parts of chlorosulfonic acid and are treated with 0.25 part of iodine and 8.5 parts of bromine. The reaction mixture is stirred 15 to 16 hours at 20 to 25° C. and then poured onto ice with 10 parts of sodium bisulfite and is filtered and washed acid-free. The resulting brominated dimethoxyisodibenzanthrone contains somewhat in excess of two atoms of bromine. It is soluble in concentrated sulfuric acid with a claret color and in warm alkaline hydrosulfite with a blue color from which cotton is dyed in bright greenish blue shades somewhat greener than the corresponding halogen-free compound.

*Example 7*

19 parts of Bz2,Bz2'-diethoxyisodibenzanthrone (obtained by ethlation of purified Bz2,Bz2'-dihydroxyisodibenzanthrone obtained according to U. S. patent application Serial No. 91,440, July 18, 1936) are dissolved at 5 to 10° C. in 95 parts of chlorosulfonic acid and are treated with 0.19 part of iodine and 5.6 parts of bromine. The reaction mixture is warmed to 20° C. and is stirred 15 to 16 hours at 20 to 25° C. The reaction mixture is poured out onto a mixture of ice and excess sodium bisulfite and is filtered and washed acid-free. The product, dibromo-Bz2,Bz2'-diethoxyisodibenzanthrone, consists of a dark blue powder soluble in concentrated sulfuric acid with a claret color and in warm alkaline hydrosulfite solution with a blue vat from which cotton is dyed in bright greenish blue shades.

As illustrated in the above examples, the bromination of the dioxo-, dihydroxy- or the alkylated dioxyisodibenzanthrone may be carried out in sulfuric acid or chlorosulfonic acid. The halogenation may also be carried out in organic solvents, such as nitrobenzene, or in aqueous suspension. Other halogenation catalysts than the iodine mentioned may of course be employed.

What I claim is:

1. A halogen containing Bz2,Bz2'-dialkoxyisodibenzanthrone.
2. A bromine containing Bz2,Bz2'-dimethoxyisodibenzanthrone.
3. Bz2,Bz2'-dimethoxyisodibenzanthrone carrying in the molecule at least two bromine atoms.

EDWARD T. HOWELL.